United States Patent [19]

Haywood et al.

[11] Patent Number: 5,573,818

[45] Date of Patent: Nov. 12, 1996

[54] COLLAPSIBLE VOID FILLER

[75] Inventors: Gerald A. Haywood, Hohenwald; Gregory S. King, Mount Pleasant, both of Tenn.

[73] Assignee: Shippers Paper Products, Glenview, Ill.

[21] Appl. No.: 361,222

[22] Filed: Dec. 21, 1994

[51] Int. Cl.[6] .................................................. B32B 3/12
[52] U.S. Cl. ......................... 428/12; 52/793.1; 206/814; 428/116; 493/966
[58] Field of Search ................. 428/12, 116; 52/793.1; 206/814; 493/966

[56] References Cited

U.S. PATENT DOCUMENTS

| | | | |
|---|---|---|---|
| 2,268,637 | 1/1942 | Bernstein | 428/116 X |
| 2,299,614 | 10/1942 | Deutsch | 428/116 |
| 2,815,795 | 12/1957 | Vander Poel | 428/116 X |
| 3,028,981 | 4/1962 | Ford et al. | 410/117 |
| 3,079,876 | 3/1963 | Doane | 428/118 X |
| 3,079,877 | 3/1963 | Doane | 428/116 X |
| 3,231,452 | 1/1966 | Thomas | 428/116 |
| 4,247,237 | 1/1981 | Brown | 428/116 X |
| 4,363,579 | 12/1982 | Rogers | 410/154 |
| 4,372,717 | 2/1983 | Sewell et al. | 428/116 X |
| 4,494,897 | 1/1985 | Rogers | 410/154 |
| 4,516,891 | 5/1985 | Wnuk et al. | 428/116 X |
| 4,585,381 | 4/1986 | Boyse | 428/116 X |
| 4,865,889 | 9/1989 | Boyse | 428/12 |
| 5,000,376 | 3/1991 | Wojdyla | 229/120.11 |
| 5,062,751 | 11/1991 | Liebel | 428/116 X |
| 5,102,272 | 4/1992 | Woods et al. | 410/154 |
| 5,132,156 | 7/1992 | Trassare, Jr. et al. | 428/116 |
| 5,484,241 | 1/1996 | Haywood et al. | 206/814 X |

FOREIGN PATENT DOCUMENTS 878255  8/1971  Canada ................................. 105/182

OTHER PUBLICATIONS

Wrapping Systems Publication 1988 Shippers Paper Products Co.

*Primary Examiner*—Henry F. Epstein
*Attorney, Agent, or Firm*—Schwartz & Weinrieb

[57] ABSTRACT

A void filler device for use in staggering or spacing apart items, such as paper rolls, during shipment includes a plurality of L-shaped members made of laminated paperboard, corrugated cardboard, plastic or other like suitable material. Each of the members has a first leg and a second leg which is angled approximately 90° relative to the first leg. The first leg includes a plurality of spaced slots, which extend approximately half of the width of the first leg, by which the members interlock with each other to form an open-cell construction that is expandable and collapsible. The void filler expands and collapses by the members moving relative to each other.

9 Claims, 2 Drawing Sheets

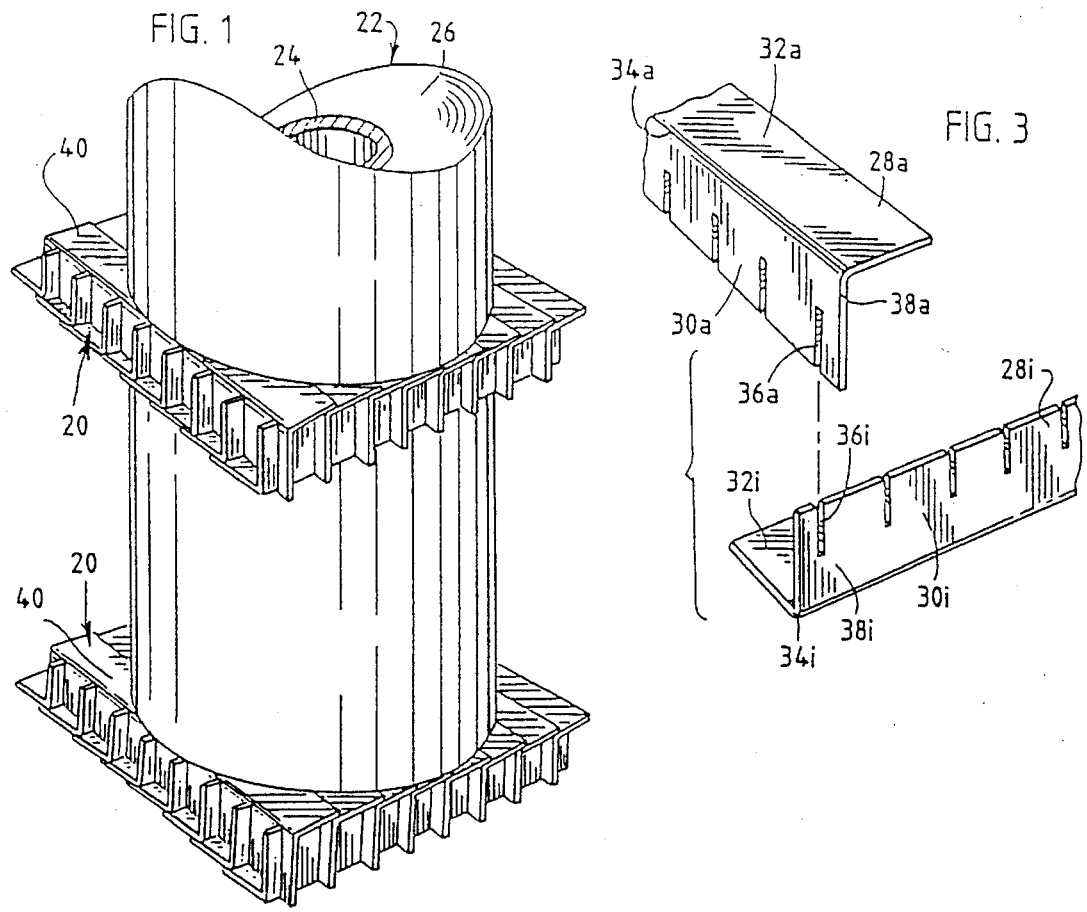
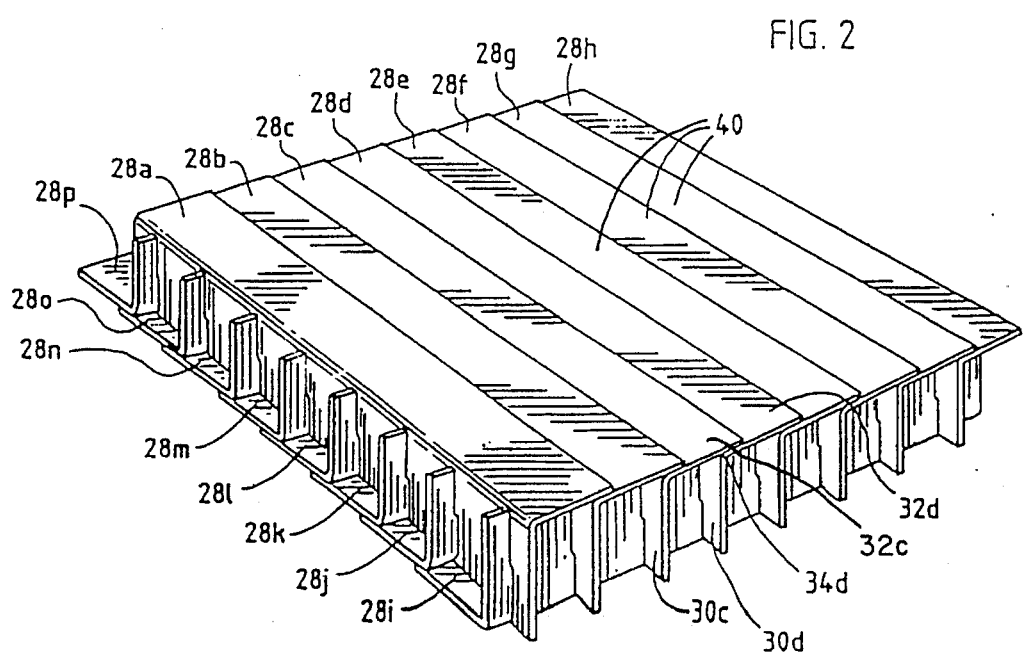

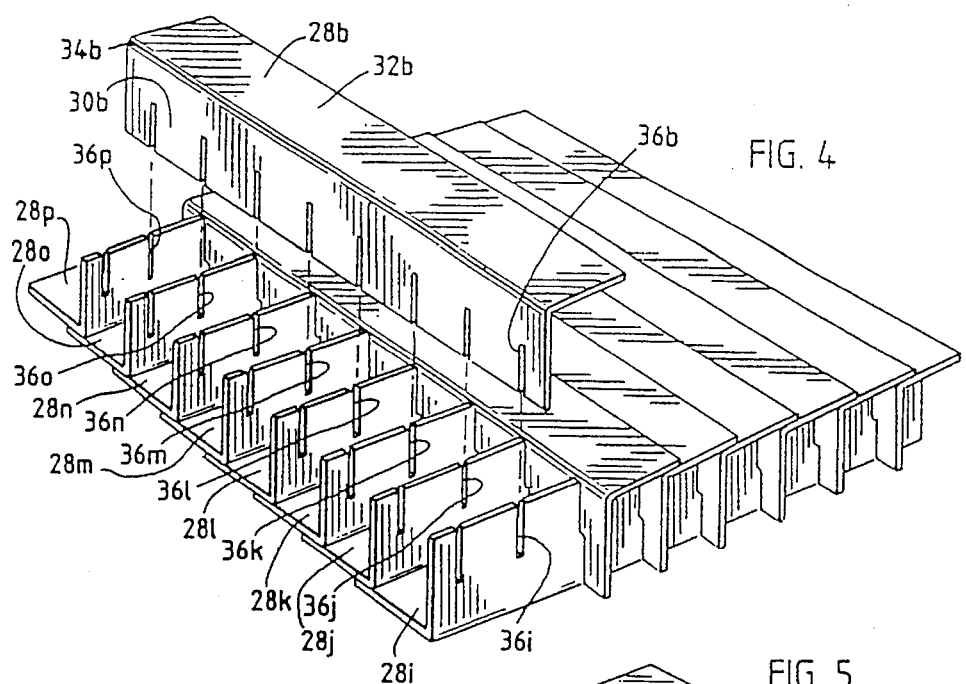
FIG. 4
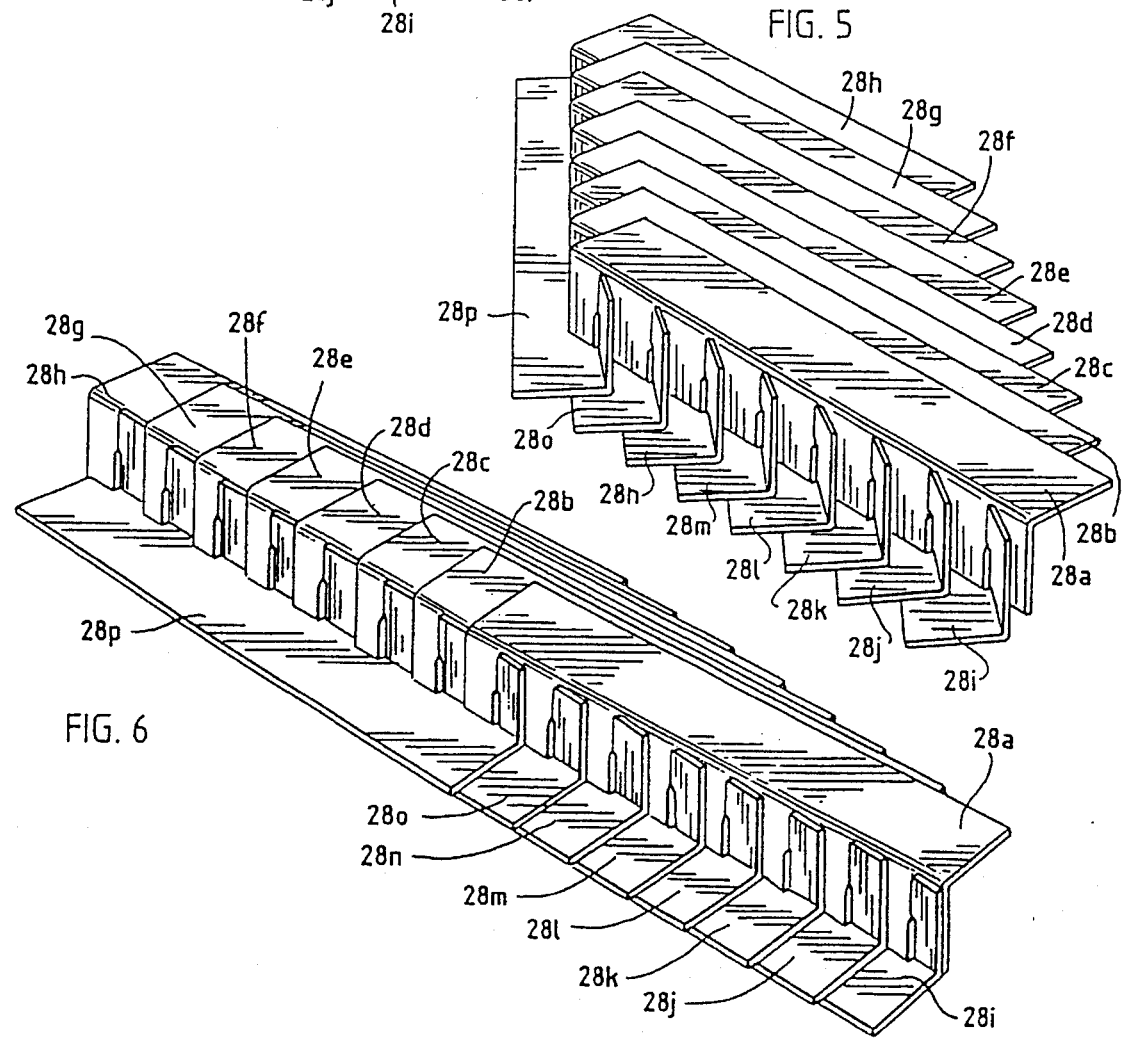
FIG. 5
FIG. 6

5,573,818

1
COLLAPSIBLE VOID FILLER

FIELD OF THE INVENTION

This invention is generally directed to a void filler which is used to stagger or space apart items, such as paper rolls, during shipment. More specifically, this disclosure is directed toward a void filler which may be expanded into a rigid configuration for use in filling spaces, and collapsed to a reduced size configuration for storage or for shipment to a user.

BACKGROUND OF THE INVENTION

The use of void fillers is well-known in the art. For example, U.S. Pat. No. 4,865,889 to Boyse presents an open-celled void filler that is comprised of a honeycomb core surrounded by deck sheets. The honeycomb core is formed from a plurality of hexagonal cells which are secured together by adhesive. The ends of the deck sheets are secured to the ends of the honeycomb core and include integrally formed scored indentations in the deck sheet along the edges of the core and along the midpoint of the deck sheets. The void filler collapses around the fold lines and the honeycomb core collapses therewithin. The void filler may be changed from a collapsed configuration to an expanded configuration by pulling the opposing ends of the deck sheets which are secured to the core away from each other until the sides of the deck sheets generally abut the core.

While this type of void filler has worked effectively in prior applications, it seems to collapse easily due to the natural tendency of the honeycomb core to collapse and the tendency of the scored indentations to urge the deck sheets of the void filler outwardly. Furthermore, the honeycomb core is costly and difficult to manufacture.

The present invention provides a novel void filler which is intended to overcome or minimize all of these problems, as well as to present several other advantages and improvements.

OBJECTS AND SUMMARY OF THE INVENTION

A general object of the present invention is to provide a novel void filler device which is used to stagger or space apart items, such as paper rolls, during shipment.

An object of the present invention is to provide a novel void filler device which can collapse for shipment to a user or for storage while occupying a relatively small amount of space, and then be expanded by a user for use.

It is another object of the present invention to provide a novel void filler device which provides resistance to crushing and distortion by a load.

A further object of the present invention is to provide a novel void filler device that is lightweight, rigid and strong.

Briefly, and in accordance with the foregoing, the present invention discloses a novel collapsible void filler device which is foldable to a reduced size, collapsed configuration for storage or shipment to a user, and unfoldable into an expanded configuration for use in staggering or spacing apart items, such as paper rolls, during transit or shipment. The void filler includes a plurality of L-shaped members made of a suitable rigid material which form an open cell construction. The L-shaped members are preferably formed of laminated paperboard which is available from Shippers Paper Products, the assignee of this application, under the

2
trademark ANGLEBOARD® or other suitable material including plastic. Each of the L-shaped members has a first leg and a second leg which is angled approximately 90° relative to the first leg. The first leg includes a plurality of spaced slots, which extend approximately half of the width of the leg. The L-shaped members interlock with each other by aligning the slots along a first leg with slots along another first leg and pushing the board members together until the edges of the board members lie generally flush with one another. The void filler expands and collapses by the L-shaped members moving relative to each other while remaining interlocked.

BRIEF DESCRIPTION OF THE DRAWINGS

The organization and manner of the structure and operation of the invention, together with further objects and advantages thereof, may best be understood by reference to the following description, taken in connection with the accompanying drawings in which like reference characters designate like or corresponding parts throughout the several views, and wherein:

FIG. 1 is a perspective view of two void fillers which incorporate features of the present invention shown supporting paper rolls;

FIG. 2 is a perspective view of a void filler in an expanded configuration in accordance with the present invention;

FIG. 3 is a partial perspective view of two L-shaped boards which form the void filler of the present invention;

FIG. 4 is a perspective view of the void filler partially assembled;

FIG. 5 is a perspective view of the void filler in a partially collapsed configuration; and FIG. 6 is a perspective view of the void filler shown in a collapsed configuration.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring to the drawings, a void filler 20 which incorporates features of the present invention is illustrated. The void filler 20 is used to fill empty spaces between pieces of cargo during transit or shipment. It may be used in a variety of shipping applications, such as a truck trailer, a ship or an airplane cargo bay. The void filler 20 may have a variety of sizes. In use, the void filler 20 can be collapsed for shipment to a user or for storage while occupying a relatively small amount of space, and then expanded by the user for use during shipment or transit.

As shown in FIG. 1, the void filler 20 of the present invention is used to stagger or space apart paper rolls 22. While paper rolls 22 are shown in FIG. 1 and are used in the description of the load herein, it is to be understood that the void filler 20 of the present invention may be used to stagger or space apart other items which are being transported and is not limited to use with paper rolls.

The paper rolls 22 are of a known construction and as such will only be described briefly herein. Each paper roll 22 is cylindrically shaped and has a cylindrical, hollow core 24 in the center. Paper 26 is wrapped around the core 24. The ends of the paper roll 22 have a circular profile.

As shown in FIG. 2, the void filler 20 of the present invention includes a plurality of interlocking and interconnecting L-shaped board members 28a–p. It is to be understood that more than or less than the illustrated amount of board members may be used. While the void filler 20 shown in FIG. 2 has each board member identified with a separate reference numeral, that is 28a–p, for simplicity in explaining the construction of the void filler 20, the board members 28a–p and the components of the board members 28ap will be designated generally as 28 herein unless it is necessary to describe individual board members for clarity in the explanation of the void filler 20 construction. Likewise, components of the board members 28a–p will be designated by general numerals unless clarity requires specific components to be designated.

Each L-shaped board member 28 is a one piece member and includes a first leg 30 and a second leg 32 joined together at a fold line or juncture 34. Each leg 30, 32 is generally flat and elongate, having a length and a width. The first leg 30 and second leg 32 are angled relative to each other, preferably at approximately a 90° angle to form the L-shape.

The board member 28 is made of a suitable rigid material, preferably laminated paperboard available under the trademark ANGLEBOARD® from Shippers Paper Products, the assignee of this application, corrugated cardboard, plastic and the like. The paperboard, corrugated cardboard, plastic and the like provides the void filler 20 with rigidity and strength so the void filler 20 can support the load created by the items, that is, the paper rolls 22, and provides resistance to crushing and distortion by the paper rolls 22. Furthermore, since paperboard, corrugated cardboard or plastic and the like is used in the void filler 20 construction, the void filler 20 is lightweight.

The first leg 30 of each board member 28 includes a plurality of notches or slots 36 which are spaced apart along the length of the member 28 and each of which lie adjacent to an uninterrupted portion 38 in the first leg 30. Each slot 36 extends approximately half of the width of the first leg 30 and is approximately the same width as the thickness of the first leg 30.

As shown in FIG. 3, the L-shaped board members 28a and 28i, are interlocked or interconnected with each other by aligning a slot 36a in the first leg 30a of board member 28a with a slot 36i in the first leg 30i of the board member 28i and pushing the board members 28a and 28i together until the edges of the board members 28a and 28i lie generally flush with one another. Since the widths of the slots 36a, 36i are approximately the same as the thicknesses of the first legs 30a, 30i of the board members 28a, 28i, the uninterrupted portions 38a, 38i of the first legs 30a, 30i are trapped within the slots 36a, 36i and the board members 28a, 28i remain interlocked and interconnected with each other.

As shown in FIG. 4, several board members (all except board members 28a and 28b) have been interlocked together in accordance with the above-described assembly method. Board member 28b is shown in an exploded position to show how the board member 28b interlocks with board members 28i–p. As shown, the slots 36b of board member 28b will engage and interlock with the other board members 28i–p along the respective slots 36i–p in the board members 28i–p.

Once all of the board members 28 are interlocked and interconnected with each other, as shown in FIG. 2, the outer surfaces 40 of the second legs 32 form a bearing surface upon which the paper roll 22 can be placed. When in an expanded configuration, the first legs 30 of the board members 28 are generally parallel to each other and spaced apart from each other and the second legs 32 are generally parallel to each other and spaced apart from each other. Thus, an open-celled configuration results when the void filler 20 is in an expanded configuration.

As shown in FIG. 2, the second legs 32 of the void filler 20 may overlap each other. For example, the second leg 32c of board member 28c overlaps the juncture 34d and a portion of the second leg 32d of the preceding board member 28d. In this form, the bearing surface 40 is uninterrupted by openings. It is to be understood that the second leg 32c may overlap a small portion of the preceding leg 32d or may overlap substantially all of the leg. Alternatively, the second leg 32c need not overlap the preceding leg 32d at all (not shown). In this form, spaces or openings are formed in the bearing surface.

To expand the void filler 20, as shown fully expanded in FIG. 2, or collapse the void filler 20, as shown in FIGS. 5 and 6, a user shifts an end of the void filler 20 which causes the board members 28 to pivot relative to one another. The L-shaped board members 28 move relative to each other by the uninterrupted portions 38 pivoting relative to the slots 36 so as to collapse the void filler 20. When expanded, the void filler 20 is an open-celled configuration. When collapsed, the void filler 20 is folded, to a reduced size configuration. When the void filler 20 is in a collapsed configuration, the void filler 20 does not occupy a large volume of space while stored or being shipped to user. Multiple void fillers 20 may be stacked on top of each other for shipment to the user or for storage.

In use, when the void filler 20 is in an expanded configuration, the rigid void filler 20 is placed between items, such as paper rolls 22 or between a paper roll 22 and a structure, such as a floor, with the bearing surface 40 abutting the paper roll 22. The forces created by the load of the paper rolls 22 during transport or shipment are resisted by the void filler 20 so the paper rolls 22 are stabilized during shipment and thus prevent or minimize damage to the paper rolls 22 during transit or shipment.

The void filler 20 of the present invention can be assembled and disassembled easily and quickly without specialized training. Furthermore, the void filler 20 is reusable.

While an embodiment of the present invention is shown and described, it is envisioned that those skilled in the art may devise various modifications of the present invention without departing from the spirit and scope of the appended claims. The invention is not intended to be limited by the foregoing disclosure. It is therefore to be understood that within the scope of the appended claims, the present invention may be practiced otherwise than as specifically described herein.

The invention claimed is:

1. A void filler device, comprising:

a plurality of interlocked members which form an open cell construction and which are movable with respect to each other while interlocked with each other such that said void filler device is expandable and collapsible, wherein each one of said members comprises a first leg and a second leg, said first and second legs are disposed at a predetermined angle with respect to each other, said first leg of each one of said members has means thereon for interlocking said members together, and said second leg of each one of said members overlaps said first legs of said plurality of interlocked members, when said void filler is disposed in an expanded state, such that said first and second leg members cooperate together so as to provide said void filler device with a bearing surface upon which a load can be placed and supported.

2. A void filler device as defined in claim 1, wherein said interlocking means comprises a plurality of spaced slots, said members interlocking with each other along said slots to form said open cell construction.

3. A void filler device as defined in claim 2, wherein each of said slots extends approximately half of the width of said first leg, and said void filler expands and collapses by said members pivoting relative to each other.

4. A void filler device as defined in claim 1, wherein said first leg is at approximately a 90° angle relative to said second leg.

5. A void filler device as defined in claim 1, wherein said members are made of laminated paperboard.

6. A void filler device as defined in claim 1, wherein said members are made of plastic.

7. A void filler device as defined in claim 1, wherein said second legs overlap each other.

8. The void filler as set forth in claim 1, wherein:

said plurality of interlocked members comprise two sets of said interlocked members wherein said first legs of one of said two sets of interlocked members are disposed perpendicular to said first legs of the other one of said two sets of interlocked members within intersecting planes when said void filler device is disposed in said expanded state, and said second legs of said one of said two sets of interlocked members are disposed perpendicular to said second legs of said other one of said two sets of interlocked members within parallel planes when said void filler device is disposed in said expanded state.

9. The void filler as set forth in claim 1, wherein:

each one of said plurality of interlocked members has a substantially L-shaped configuration in cross-section.

* * * * *